Patented Aug. 30, 1932

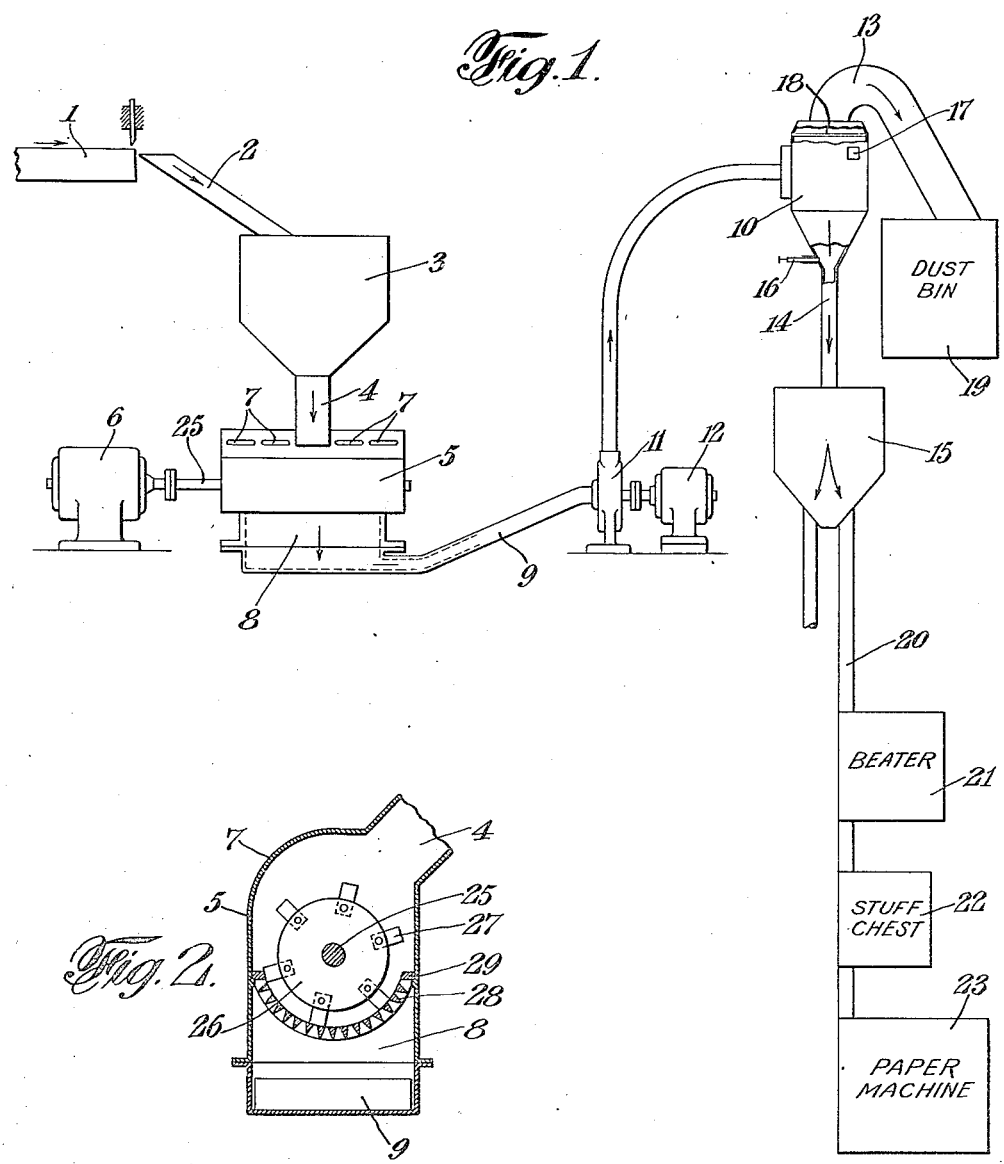

1,875,045

UNITED STATES PATENT OFFICE

NATHAN LESENER, OF CINCINNATI, AND WILLIAM J. MOELLER, OF MOUNT HEALTHY, OHIO, ASSIGNORS TO THE PHILIP CAREY MANUFACTURING COMPANY, A CORPORATION OF OHIO

PREPARED STOCK RECLAIMED FROM WASTE MATERIALS AND METHOD OF AND APPARATUS FOR RECLAIMING SAME

Application filed February 3, 1927. Serial No. 165,544.

Our invention is a prepared stock, reclaimed from waste materials, for manufacture of textile, paper and like products, and apparatus for, and method of, production of said stock from waste materials.

Heretofore there have been large quantities of waste materials of a fibrous character, that having served their purpose, have been destroyed and are not suitable for being readily converted into other products. There have also been cuttings and trimmings produced in various industries that have been in a like class. Other waste materials, such as cement bags, which, because of cement dust in them, could not be used. Hair which was in such matted condition, it could not be used. Fibrous textile products, such as asbestos gloves, which had in use become discolored, worn and were useless. Imitation leathers, belting and similar materials, which, having served their purpose and become worn were useless waste because of the oils, paints and other materials used in their manufacture, or with which they had in use become saturated. These waste materials and others of like character, especially those of a fibrous nature or which could be by our process fiberized, we have reclaimed from useless waste and are now capable of being treated by our method and converted into valuable stock for the manufacture of many products of textile or paper nature, or other products in which fibrous materials are used or are used in conjunction with other materials.

In carrying out our method, we take waste materials, which, if in large pieces are first preferably cut to a size readily handled, and put same into a fiberizing machine, thru which is passing a current of air drawn by a suitable blower. This waste material is placed into this fiberizing machine preferably in a dry or slightly moist condition as distinguished from fiberizing in the presence of water or other liquid. In this machine the waste materials are torn and shredded to reduce to, or to form, independent fibres. These fibres may be either elementary fibres, or fibres which are in turn composed of a plurality of elementary fibres. This shredding, tearing or fiberizing operation, by reason of the material being in a comparatively dry condition, serves not only to fiberize the waste material but also to remove dust, oil and other minute foreign particles from it. The current of air serving to carry away and separate the minute, light, dry particles, evaporates the volatile oils and likewise conveys away from the machine the now fiberized product. Any heavy foreign matter drops by gravity to the bottom of the machine where it is from time to time readily removed. The independent fibres and the dust being of a lighter nature are readily carried to a separator where the dust and fibres are separated, the fibres passing to stock storage bins and the dust, which may contain some fibres, passing to a dust chamber where a further separation by gravity or air and gravity is had and these resultant fibres are of a character that they can be utilized in manufacture where a shorter fibre is suitable.

The result of this method is the utilization of many heretofore useless waste materials, of which there has been a great quantity, such as cement bags, asbestos textile materials, hair products, hair waste, leather, imitation leathers, felt materials, trimmings and cuttings of belts, burlap, etc.

Our method not only enables us to utilize what has heretofore been useless waste materials, but it enables us to produce from waste materials of a fibrous character, or capable of being converted into fibres, a fibrous stock adapted for use in many industries at a much lower cost than has heretofore been done and with a resultant product of a much better quality.

As an example—heretofore in the paper making industry it has been the practice to sort the materials, place them in a beater in the presence of water, and beater treat for several hours to produce the fibrous stock of the desired character, with which to make the paper; with our method we reduce the stock, while dry or only slightly moist, into the desired fibrous condition, while removing foreign matter, in a very few minutes, when it can be placed in a beater with such other materials as may be used in the presence of water, and beater treated only long enough to completely mix and saturate the materials to the proper consistency to make the desired grade of paper, which beater operation is a matter of comparatively short time, that is, compared with time required by the old method, on the same grade of stock, to form the batch.

In carrying out our method, to produce our product, we have invented the apparatus shown in the accompanying drawing. Of course, as other apparatus may be used, we do not limit ourselves to that shown.

In the drawing, Fig. 1 shows diagrammatically our apparatus for carrying out our method and for producing our fiberized product. Fig. 2 is a cross section of the fiberizing machine.

As shown, 1 is a cutter adapted to reduce the raw mtaerial to the desired size for treatment in the shredder. 2 is a chute from the cutter to the raw material bin or reservoir 3. From the reservoir 3 is a chute 4 leading to a fiberizing machine 5 which is operated by a motor 6. While this fiberizing machine may be of any desired construction, we have obtained very satisfactory results by using a rapidly rotating machine in which the rotating member 26 mounted on shaft 25 is provided with swinging arms 27 pivotally mounted at one end and throw out by centrifugal force so as to contact with the waste material. Below the rotating member 26 of this fiberizing machine and concentric with said rotating member, is arranged an arc shape screen, provided with bars 28 arranged parallel to the axis of rotation of said rotating member, which bars are provided with cutting or fiberizing edges, which, in conjunction with the swinging members on the rotating member of the machine, operate to tear or cut the waste materials and loosen or separate the foreign matter from same.

This fiberizing machine is provided with one or more openings 7, arranged so that air may be readily drawn into the machine and pass down and thru the chamber in which the rotating means is located, thru the screen, into a reservoir or bin 8, located below the fiberizing screen. From this reservoir or bin 8, is a conveyor 9, leading to a separator 10. Located in the conveyor 9, is a fan or blower 11, operated by a motor 12. This fan or blower 11, draws the air thru the fiberizing machine into the reservoir or bin 8, and passes it thru the conveyor 9, to the separator 10. This separator 10, is provided with a chute 14, leading to storage bins 15, for the fiberized material. Located in the chute 14, is a valve 16, to hold the fiberized material in the separator 10, until such time as the separator has become full, which can be seen by an operator thru the door or window 17. In the top of the separator is provided a screen 18. 13 is a conveyor from the separator 10, to a dust chamber 19. As the fiberized material is conveyed thru the conveyor 9, into the separator 10, it is held in the separator 10, by a screen 18, and the air current passes through the screen 18 carrying with it the lighter particles of dust and foreign matter, and of course, some fibrous material, a slight amount of which fibrous material is conveyed through the screen, through the conveyor 13, into the dust house 19, where the air current being reduced, the fibrous material with some of the heavier particles of dust, is deposited by gravity on the floor and the lighter particles of dust pass out through another screen with the air.

If our apparatus is to be used in the manufacture of paper or similar felted materials, the fiberized product in the reservoir 15, passes thru the chute 20, into the beater 21, where it is beater treated with other materials in the presence of water until the desired moisture has been obtained. From there it passes into the stuff chest 22, and from there to paper machine 23.

As the beater and the stuff chest and paper machine may be the ordinary apparatus used in the art, we have not described or shown them in detail.

If desired the bin for receiving the fiberized stock could be arranged below the fiberizing machine 5 and the conveyor used to carry the dust and air from that bin to the dust bin.

We claim:

1. The method of producing fibrous stock from waste materials consisting of reducing said fibre containing materials in the presence of a current of air to a mass of independent fibres.

2. The method of producing fibrous stock from waste materials consisting of reducing said fibre containing materials in the presence of a current of air to a mass of independent fibres and separating therefrom foreign materials.

3. The method of producing from waste fibre containing materials a fibrous stock for use in textile, paper, and like manufacture, consisting in fiberizing said waste in the presence of a current of air and conveying the fiberized material to a separator and separating the foreign material therefrom.

4. An apparatus for reclaiming waste fibre containing materials consisting of means for fiberizing said waste material and means subjecting the material being fiberized to the action of a current of air simultaneously with said fiberizing operation.

5. An apparatus for reclaiming waste materials, a fiberizing machine, a separator, a conveyor from said fiberizing machine to said separator and means for passing a current of air thru the fiberized material during fiberizing to separate foreign materials therefrom.

6. The method of producing fibrous stock from waste fibre containing materials consisting in fiberizing that portion of said waste material of a fibrous character, freeing foreign materials of non-fibrous character from fixed contact with said fibrous material and reducing same to relatively minute particles, subjecting said fibrous and non-fibrous materials to the action of an air current during said fiberizing whereby the non-fibrous foreign materials are removed from the fibrous mass.

7. The method of producing fibrous stock from waste fibre containing materials containing foreign substances of an oily character, consisting in fiberizing said waste materials and simultaneously extruding the oily content therefrom and simultaneously treating said material to the action of a current of air to facilitate evaporation of the oils so extruded.

8. The method of producing fibrous stock from waste fibre containing materials of a textile character, coated with film of non-fibrous material, consisting in fiberizing said textile material and simultaneously reducing said coating to minute dust like particles and simultaneously therewith subjecting said dust like particles and said fiberized material to the action of an air current whereby the dust like particles are removed from the fibrous material.

9. In an apparatus for reclaiming waste fibre containing materials, means for fiberizing the materials and means for simultaneously subjecting said materials to the action of a current of air.

10. In an apparatus for reclaiming waste fibrous materials, means for fiberizing the materials, a chamber below said fiberizing means and means for subjecting the material, while being fiberized, to an action of a current of air.

In testimony whereof, we have signed our names to this specification.

NATHAN LESHNER.
WILLIAM J. MOELLER.